United States Patent [19]

Kwasnoski et al.

[11] 4,140,586
[45] Feb. 20, 1979

[54] METHOD AND APPARATUS FOR DISTILLATION

[75] Inventors: Daniel Kwasnoski, Hellertown; Charles J. Sterner, Bethlehem, both of Pa.

[73] Assignee: Bethlehem Steel Corporation, Bethlehem, Pa.

[21] Appl. No.: 695,625

[22] Filed: Jun. 14, 1976

[51] Int. Cl.$^2$ .................. B01D 3/38; C01C 1/10
[52] U.S. Cl. .................. 203/47; 203/49; 203/10; 203/96; 423/356
[58] Field of Search .......... 203/27, 49, 96, 95, 203/97, 92, 93, 10, 11, 47, 21, 22–26; 423/356, 357, 352; 202/233, 234, 153; 62/17, 18

[56] References Cited

U.S. PATENT DOCUMENTS

| | | | |
|---|---|---|---|
| 246,949 | 9/1881 | Gruneberg et al. | 202/153 |
| 273,411 | 3/1883 | Wardwell | 202/159 |
| 358,196 | 2/1887 | Gruneberg et al. | 202/153 |
| 376,351 | 1/1888 | Simpkin | 422/198 |
| 521,401 | 6/1894 | Charlton et al. | 203/49 |
| 929,726 | 8/1909 | Stine | 203/49 |
| 1,244,903 | 10/1917 | Schuster | 203/42 |
| 1,264,512 | 4/1918 | Hechenbleikner | 203/49 |
| 1,307,739 | 6/1919 | Jones | 203/49 |
| 1,928,510 | 9/1933 | Sperr | 203/36 |
| 2,029,467 | 2/1936 | Day | 203/36 |
| 2,501,326 | 3/1950 | Gilmore | 62/23 |
| 2,635,073 | 4/1953 | McIntire et al. | 203/36 |
| 3,265,592 | 8/1966 | Van der Weel | 203/37 |
| 3,278,423 | 10/1966 | Millar | 423/357 |
| 3,326,778 | 6/1967 | Mock | 203/49 |
| 3,498,067 | 3/1970 | Ranke | 62/17 |
| 3,826,815 | 7/1974 | Mavrovic | 423/356 |

OTHER PUBLICATIONS

A New Method of Treating Coke Plant Waste Waters, NASO et al., I & SM 3/1975, pp. 27–38.

Primary Examiner—Wilbur L. Bascomb, Jr.
Attorney, Agent, or Firm—Joseph J. O'Keefe; Charles A. Wilkinson

[57] ABSTRACT

The thermal efficiency of an ammonia still is significantly increased by the use, in conjunction with the usual countercurrent steam stripping medium, of an auxiliary inert gas stripping medium initially heated and humidified by heat exchange with hot still bottoms derived from the still.

11 Claims, 5 Drawing Figures

METHOD AND APPARATUS FOR DISTILLATION

BACKGROUND OF THE INVENTION

This invention relates to distillation methods and apparatus in which volatile components are stripped from a liquid by a stripping gas at an elevated temperature, and more particularly to the steam distillation or stripping of ammonia from coke plant liquors, commonly known as weak ammonia liquor, or WAL. While the specific discussion and examples cited herein refer to the treatment of weak ammonia liquor, or WAL, and it is in connection with the treatment of such liquor that the invention has been found most useful, the invention is equally applicable to any process which treats a liquid containing one or more volatile components with steam or other hot primary stripping gas in order to remove such components from the liquid and provide a gaseous effluent which is rich in volatile components and a liquid effluent which is poor in such components.

In the thermal decomposition of coal to produce coke for use in the steel industry, vapors are given off which contain various components including tars, light oils, phenols, naphthalenes, hydrogen cyanide, hydrogen sulfide, carbon dioxide, ammonia and moisture. Various methods for the isolation of these components have been devised, some of which are described in the U.S. Steel publication "The Making, Shaping and Treating of Steel" 9th ed., Harold E. McGannon, Ed. (1971) pp 165 et seq.

The vapors given off during thermal decomposition, or coking, of coal are customarily initially cooled in a water spray tower known as a primary cooler. During such cooling, the excess moisture in the vapor condenses and absorbs ammonia, ammonium compounds and other lesser contaminants and is then known as weak ammonia liquor. The weak ammonia liquor may be recirculated through the primary cooler several times until the liquor becomes saturated with ammonia and other components and must be treated to remove the ammonia. As is described in the cited U.S. Steel treatise, the most commonly used process for ammonia recovery from weak ammonia liquor is the semi-direct process. In this process, weak ammonia liquor, which normally contains approximately 5000–9000 p.p.m. of ammonia, is subjected to a three leg distillation process. This three leg process is necessitated by the fact that ammonia is present in the weak ammonia liquor in two broad physically distinct types of combinations, known as "free" ammonia and "fixed" ammonia. The term "free" ammonia encompasses dissolved ammonium salts of carbonate, sulfide and cyanide ions, solutions of which are thermally decomposable into their gaseous components, i.e. ammonia and acid. The term "fixed" ammonia encompasses dissolved ammonium salts, such as the chloride, thiocyanate and sulphate, solutions of which are not thermally decomposable, but which require the addition of an alkaline reagent which will chemically react with the ammonium ion, converting it to strippable ammonia gas.

The weak ammonia liquor is first subjected to a steam distillation in a so-called "free leg" of a still to drive off the "free" ammonia. The remaining liquor, containing the fixed ammonia, exits from the bottom of the "free leg" and passes into a mixing chamber where it is intimately mixed with an aqueous slurry of calcium hydroxide, commonly known as milk of lime. The resulting weak ammonia liquor/calcium hydroxide mixture from the so-called "lime leg" is then passed into the "fixed leg" of the still where ammonia is stripped from the liquor by the use of steam. The hot effluent liquors, or still bottoms, containing only a trace amount of ammonia, are passed out the bottom of the still and into a waste liquor sump from which they may be removed for further treatment before disposal.

Both the free leg and the fixed leg of a conventional still are vertically upright cylindrical columns, usually positioned one upon the other, having a number of horizontal trays spaced along the height of each column. Each of these trays is equipped with bubble cap assemblies or sieve-type orifices through which steam may pass upwardly from tray to tray and is usually also equipped with downcomers through which weak ammonia liquor may descend from tray to tray, all as well known to those skilled in the art. Ascending steam is intimately mixed with descending weak ammonia liquor at each tray level.

In a conventional ammonia still, steam is supplied to the bottom of the fixed leg at a point below the lowest tray, but above the level of the still bottoms, under pressure sufficient to force the steam upward through the tray openings of both the fixed leg and the free leg to the top of the still column, where the steam leaves the free leg carrying with it the ammonia and other volatile gases. The steam/ammonia stream is then passed through a dephlegmator to cool and condense a portion of the steam, thereby enriching the ammonia content of the gas stream. Following the dephlegmator, the enriched steam/ammonia stream may either be passed to a sulfuric acid saturator, in which ammonium sulfate is produced, or passed to an incinerator for destruction of the ammonia and other combustible gases.

A second type of ammonia still substitutes a solution of sodium hydroxide for the conventional milk of lime slurry in order to avoid certain operating problems which occur in conventional stills. This more recent still is described in an article in the March 1975 issue of I&SM entitled "A New Method of Treating Coke Plant Waste Waters" by A. C. Naso and J. W. Schroeder, beginning at page 27.

Both the conventional and the more recently developed ammonia stills utilize steam, or occasionally some other hot gas, as a direct contact stripping medium. Steam has historically been attractive for such use both because of its low cost and its ready availability in steel plants. Recently, however, the cost of steam production has increased drastically due primarily to increased fuel cost. For this reason there is a demand for new and more efficient distillation systems.

Attempts have been made in the past to increase both the thermal efficiency of steam distillation systems in general and weak ammonia liquor (WAL) distillation systems in particular. For example, several inventors have attempted to use the waste heat from the steam and ammonia vapor passing from the top of the ammonia still to heat the incoming WAL. Several such arrangements have been patented. Prior inventors have also attempted to take advantage of the higher temperature of the still bottom effluent to initially heat the incoming WAL. In these arrangements the WAL entering the still has been passed first through a heat exchanger in heat exchange relationship with the hot still bottoms. Several such arrangements have also appeared in U.S. patents. While heat values would seem to be conserved by this sort of arrangement, the efficiency of the distilling operation is not greatly increased. This is because it is desirable from an efficiency standpoint to make maximum use of the heat in the incoming steam within the distilling column itself. Consequently the vapors leaving the column should be as cool as possible. By preheating the incoming WAL with heat from the distillation operation itself and then passing such preheated WAL into the top of the still, the upper portions of the still are heated with the result that the vapors entering the condenser and/or leaving the top of the still tend to be hotter rather than cooler. As a result more, rather than less, heat is exhausted from the distillation apparatus with a consequent loss in thermal efficiency.

It has also been suggested in the past to use other stripping mediums than steam in an attempt to increase the efficiency of an ammonia distillation system. Thus, in a distillation arrangement shown in U.S. Pat. No. 1,244,903 to Schuster, tar-free superheated coke oven gas is used as a substitute for steam in an ammonia still. This hot gas serves both as the heat source for the still and as the carrier medium to strip ammonia from ammonia containing liquor. Increased efficiency is asserted, but since the coke oven gas must be heated from some external source of heat, just as steam must be, the thermal efficiency is not greatly increased. The previously noted article by Naso and Schroeder also discloses the use of heated air to replace all or a part of the usual steam for stripping. The use of steam can be essentially eliminated in such an arrangement except to heat and humidify the air. However, any blend of steam and air can also be used to strip the ammonia from the WAL. The thermal efficiency of such arrangements is again not greatly increased, however, because an external heat source is used to preheat the air.

SUMMARY OF THE INVENTION

The thermal efficiency of a distillation operation, and particularly a weak ammonia liquor distillation operation, may be very significantly increased in accordance with this invention. The present inventors have discovered that the sensible heat values present in still bottoms exiting from an ammonia still may be used in a novel manner to reduce the steam demand of such stills. Specifically, it has been discovered that the hot still bottoms can be used as a heat source to heat a suitable auxiliary gas in a heat exchange apparatus and that the heated auxiliary gas can then be passed into the ammonia still for use as a portion of the stripping medium. The waste heat leaving the bottom of the still in the form of hot still bottoms can thus be effectively used to return heat to the lower portions rather than the upper portions of the still. This arrangement reduces the overall steam or thermal requirements of the still.

The heat of the still bottoms is recovered in an effectively inert, non-condensable gas which can then be used to replace a portion, but not all, of the primary stripping and heating gas, i.e. steam, which serves as the primary heat source. The heat recovered in this manner enables less primary gas, and possibly in some cases cooler primary gas, to be used, with a consequential very significant saving in overall heat values used. It may be noted that the heat of the still bottoms could not be recovered by contacting the primary stripping gas with the still bottoms because the primary gas is hotter than the bottoms. The cooler auxiliary gas, however, can be heated by the hot still bottoms to an intermediate temperature and this intermediate temperature gas can then be further heated by the primary gas either in the still, or by being pre-mixed with the primary gas prior to passage to the still. The heat extracted from the hot still bottoms by the auxiliary gas will therefore provide some of the heat required by the still operation, thus decreasing the total heat which must be supplied by the primary stripping and heating gas. The distillation system of the invention is thus a regenerative or partially regenerative system.

The heat recovered from the still bottoms is used in large part to humidify the auxiliary gas prior to use for stripping. In order for proper stripping to take place it is necessary for a hot gas to be passed through the hot weak ammonia liquor. Almost any hot gas would theoretically be effective since the stripping is largely a mass action effect of gas passing through the liquor. Most hot gases, however, will absorb considerable quantities of water vapor and in so doing will decrease the temperature of the weak ammonia liquor. Steam is an ideal stripping gas from this standpoint, because it is in effect already humidified and does not extract heat from the liquor. Steam, however, requires a very large amount of heat in the form of calories for initial vaporization. Other essentially inert, noncondensable gases would be more efficient from this standpoint as stripping gases, because they would require no heat for initial vaporization, but could, if it were not for the humidification problem, merely be heated to the proper temperature for stripping with a relatively small calorific input. Unfortunately, all such gases would extract heat from the ammonia liquor as they became humidified upon first contact with the weak ammonia liquor.

It is consequently much preferred in the present invention to reduce the steam demand even more by both heating and humidifying the inert, noncondensable gas in a direct contact, countercurrent heat exchanger. The auxiliary stripping gas is then both heated and thoroughly humidified at the same time, so that upon entrance into the stripping portions of the still the heated gas, like steam, does not extract any significant heat from the process as a whole. The steam demand for stripping is thus even more significantly decreased over that which is usual and the additional heat content of the humidified auxiliary stripping gas is also available for heating the contents of the still. If the auxiliary stripping gas, on the other hand, is merely heated in the heat exchanger by indirect contact with the hot still bottoms, the gas will be heated and may be used to replace part of the steam, but when the gas enters the stripping portion of the ammonia still it will extract heat from the still as it is humidified. Extra steam, or hotter steam, must then be used to replace the heat used to get moisture into the gas. While the same total heat or total calories will be used to humidify the hot gas whether humidification is accomplished in the heat exchanger or in the still proper, if humidification is accomplished in the heat exchanger the temperature of the still proper is preserved and more heat is available to the system from the auxiliary stripping gas. On the other hand, if the humidification is accomplished in the still proper less total heat values are carried into the still by the auxiliary stripping gas, the average temperature of the entire still will be decreased, and extra steam must be used to make up this loss.

It will thus be seen that a very large portion of the heat recovered in a direct contact heat exchanger will be used to humidify the auxiliary gas and make it suitable for use as a direct replacement for the primary stripping gas, steam. The use of the direct heat exchanger of the invention, therefore, effects a saving of steam not only by providing additional heat to heat the still but also by conditioning a second auxiliary stripping gas to serve as a direct replacement for a significant portion of the primary stripping gas, steam.

As used herein, the term "inert gas" refers to a gas which is substantially non-reactive with the components of a liquid which is being stripped or distilled. The term "non-condensable gas" refers to a so-called true gas which cannot be condensed or liquified except under unusual conditions of temperature and/or pressure not likely to be encountered.

DESCRIPTION OF THE PREFERRED EMBODIMENT

Figure 1:
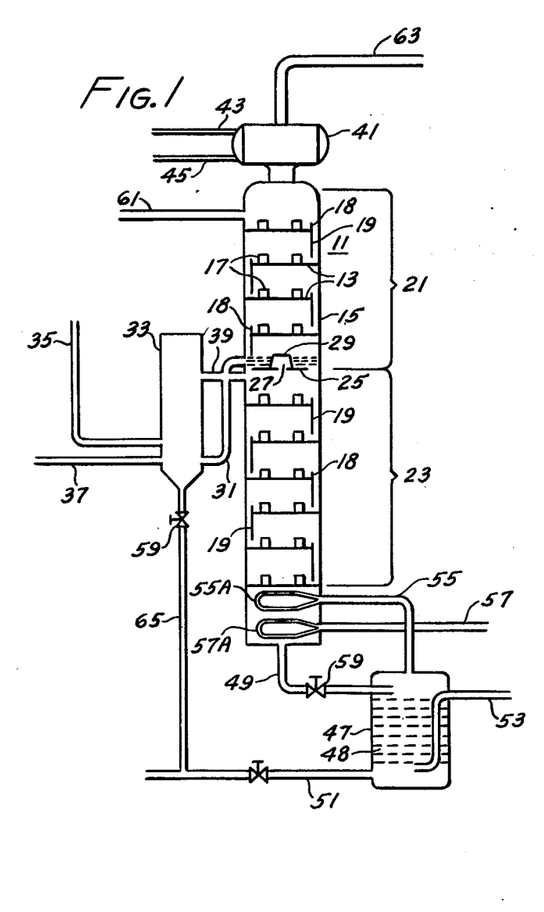
FIG. 1 is a schematic cross-sectional representation of one embodiment of apparatus for practicing the invention.

A broad understanding of the invention will be gained by one skilled in the art from the following discussion with reference to FIG. 1.

In FIG. 1 there is shown in schematic cross section, a conventionally designed ammonia still 11 improved in accordance with the present invention. In FIG. 1 numeral 13 designates a series of trays supported within a shell 15. Each of the trays 13 is equipped with bubble cap assemblies 17. Hot vapors may pass upwardly through the still by bubbling up from under the bubble caps through a shallow pool of ammonia liquor maintained upon the top of each tray. The ammonia liquor in turn can pass from each tray to the tray below through downcomers or overflow pipes 19. Weirs 18 at the ends of the trays restrict the flow of liquid through the downcomers so that a shallow pool of liquid is retained upon each tray sufficient to cover the bottom edges of the bubble caps and the bottom edges of the downcomers.

The ammonia still shown in FIG. 1 is conventionally divided into an upper or free leg section 21 and a lower or fixed leg section 23 by a dividing plate 25 having a central gas orifice 27 and fluid level maintaining weir 29. Liquor flows from the pool of liquid on top of the dividing plate 25 through conduit 31 into the bottom of a so-called lime leg which consists of a tank 33 which is supplied with a milk of lime suspension through a lime feed pipe 35.

The weak ammonia liquor mixes with the lime suspension in the tank 33, partially as the result of a small amount of steam which passes into the tank through a steam line 37 and the mixture then flows from the lime leg tank 33 through conduit 39 into the top of the fixed leg 23 of the still 11.

There is preferably a dephlegmator 41 on top of the still 11 which dephlegmator is supplied with cooling water through feed line 43 and return line 45.

A direct contact heat exchanger 47 is provided near the bottom of the still 11. Hot still bottoms, i.e., weak liquor from which most of the ammonia has been expelled, pass through conduit 49 from the bottom of still 11 into the top of the heat exchanger 47 and down through the heat exchanger through a suitable packing of some form such as, for example, Raschig rings or the like, but more preferably via dual flow sieve tray type baffles 48 as shown, and then collects in the bottom of the heat exchanger before passing from the heat exchanger via conduit 51 to a waste liquor sump or the like, not shown, for disposal or further treatment. Meanwhile an effectively inert gas such as decarbonated coke oven gas, air, nitrogen, or hydrogen, or an actual inert gas such as argon is passed through conduit 53 from any suitable source. The gas, which must be non-condensable under the conditions in which it will be used in the still in order to avoid operating difficulties, is passed from the end of the conduit 53 into the bottom of the heat exchanger and passes upward through the heat exchanger in direct contact with the hot liquor trickling down through the packing, baffles or sieve trays of the heat exchanger. The gas, which will be referred to hereinafter merely as inert and non-condensable, is heated by contact with the hot liquor and is also saturated with water vapor from the liquor, and passes from the top of the heat exchanger into the bottom of the fixed leg 23 of the still 11 via conduit 55 and distributor ring 55A at a temperature only a little lower than the temperature of the hot liquor. Steam is also admitted to the fixed leg 23 of the still in a conventional manner through feed conduit 57 and distributor ring 57A. The distributor rings 55A and 57A may be omitted if desired.

In FIG. 1 various valves 59 are provided at convenient points in the various conduits for controlling the process. A primary weak ammonia feed line 61 is also provided leading to the still 11 above the topmost tray. An ammonia vapor conduit 63 leads from the dephlegmator to some subsequent treatment apparatus usually comprising an ammonia cooler and absorber, not shown. A drain line 65 leads from the bottom of the lime leg tank 33 and intersects the sump line 51.

In operation, weak ammonia liquor (WAL) is admitted to the top tray in the free leg of the still via ammonia liquor feed line 61. The liquor fills the first tray to a height set by the weir 18 of the downcomer 19 and then drains progressively from tray to tray, filling each tray. A mixture of steam, hot inert gas and hot vapors from the ammonia liquor meanwhile bubble up from under the bubble caps in the free leg stripping ammonia vapor from the liquor. This ammonia vapor ultimately passes from the top of the still via line 63 together with waste steam.

When the liquor reaches the dividing plate 25, by which time most of the free ammonia will have been stripped from the liquor, it is deflected from the free leg into the lime leg tank 33 via conduit 31. The liquor is mixed in tank 33 with a milk of lime solution and passed back into the top of the fixed leg of the still via conduit 39. The lime serves to free the ammonia which is chemically bound or "fixed", so that as the liquor again passes from tray to tray of the fixed leg countercurrently with the ascending hot stripping gas and steam passing upward from under the bubble caps, the ammonia is stripped from the solution and passes upwardly with the hot gas and steam. When the liquor reaches the bottom of the still it usually contains less than 0.05% ammonia.

The liquor first collects in the bottom of the still and then passes via conduit 49 into the top of the heat exchanger 47 where it trickles down through the orifices of the dual flow sieve trays or other suitable baffles or packing countercurrently with respect to ascending inert, non-condensable gas from conduit 53. A substantial portion of the residual heat of the liquor is transferred to the non-condensable, inert gas and this heated and humidified gas then passes via conduit 55 into the bottom of the fixed leg serving to replace some of the steam normally used to heat and strip ammonia from the liquor in the still.

The use of the inert gas to recover some of the heat values from the still bottoms for reuse in the still effects a regeneration or partial regeneration with respect to the heat balance in the systemn. A particularly effective and efficient regenerative distillation system is thus formed. The non-condensable gas is also saturated with water vapor in the heat exchanger and this also conserves steam which would otherwise be used to saturate the hot gas when it reaches the ammonia still. The ammonia gas and vapors from the top of the free leg of the still may be at a temperature of about 95 to 105° C. (203 to 221° F.) or higher depending upon still back pressure and may contain anywhere from 3 to 15% ammonia depending upon conditions. A saving of from 10 to 30% of the total amount of steam normally necessary for stripping can easily be achieved by the use of the auxiliary stripping gas heated by countercurrent contact with the hot still bottoms and used in conjunction with steam or other primary stripping gas in the still in accordance with the present invention.

Figure 2:
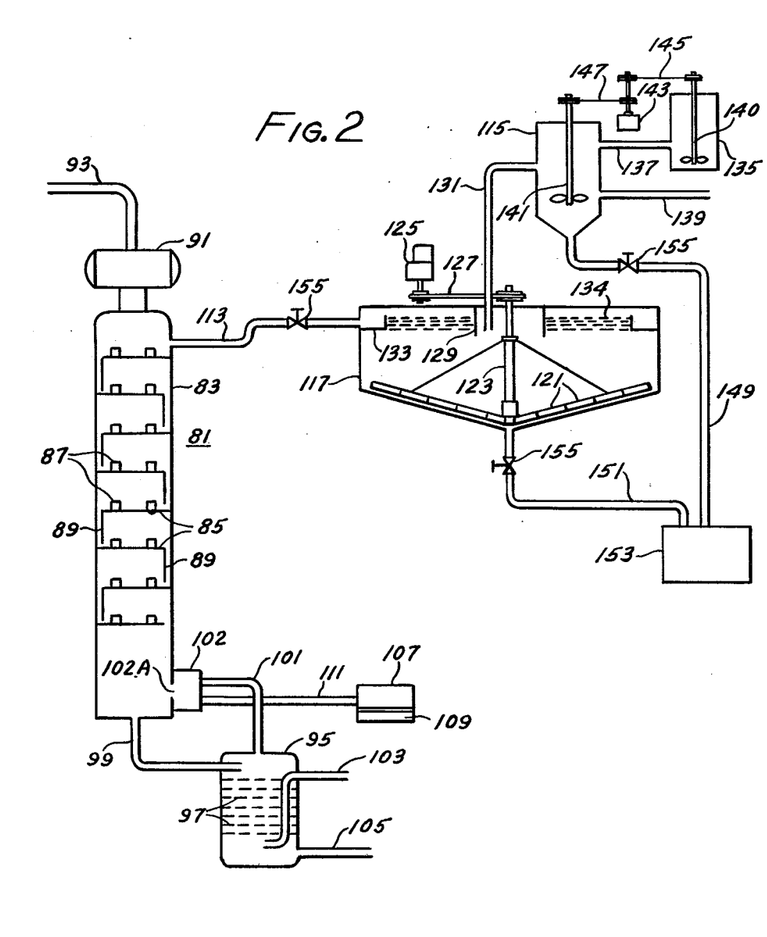
FIG. 2 is a schematic cross-sectional representation of a preferred embodiment of the apparatus of the invention.

In FIG. 2 there is shown a preferred embodiment of apparatus for the practice of the invention in which the heat exchange relationship of the invention is used with an improved ammonia distillation apparatus. In FIG. 2 there is shown an ammonia still 81 comprised of a shell 83 in which are mounted a series of trays 85 equipped with bubble cap assemblies 87 and downcomers 89 through which hot vapors and weak ammonia liquor respectively pass upwardly and downwardly through the still in countercurrent relationship. Ammonia and other vapors pass from the still via dephlegmator 91 and ammonia discharge conduit 93 to some further treatment apparatus, usually an ammonia cooler and absorber, not shown. A direct contact heat exchanger arrangement such as is shown in FIG. 1 comprised of a heat exchanger 95 having internal heat exchange plates or baffles 97 is provided adjacent the bottom of the still. The heat exchanger 95 is connected to the still 81 by a still bottom conduit 99 through which hot still bottoms pass from the bottom of the still to the top of the heat exchanger, and gas conduit 101 through which a hot, humid, inert, noncondensable gas is passed from the top of the heat exchanger to the still via a mixing chamber 102 connected to the still by an orifice 102A. Cool inert gas is passed into the heat exchanger 95 via a gas inlet conduit 103 from any convenient source, not shown, and residual still bottoms pass from the heat exchanger via conduit 105 to a sump, also not shown. The inert, non-condensable gas is heated and humidified by the hot still bottoms as they pass countercurrently through the heat exchange baffles 97. A primary stripping gas, which as shown in the drawing is steam derived from a boiler 107 which is heated by combustion chamber 109, is passed through conduit 111 into the mixing chamber 102 where it further heats the hot inert gas and is thoroughly mixed with this gas before passing as a plural or multicomponent stripping gas into the bottom of the still through the inlet orifice 102A.

Limed weak ammonia liquor is fed to the still in FIG. 2 via conduit 113 from an initial combined precipitation and clarification system, or leg, which replaces the usual free ammonia leg and lime leg of more conventional ammonia stills. Such a precipitation and clarification system is shown and described in more detail in two copending applications entitled "Method and Apparatus for Improved Distillation of Ammonia from Weak Ammonia Liquor" and "Improved Process for the Distillation of Weak Ammonia Liquor and Apparatus Therefor" filed concurrently herewith in the names of K. R. Burcaw, Jr. et al and D. Kwasnoski et al respectively and assigned to the assignee of the present invention. Initial precipitation of calcium solids from the weak ammonia liquor as shown is referred to in these copending applications as pre-precipitation. The combination of the preheated and humidified auxiliary stripping gas system of the present invention with the ammonia still system described and claimed in these copending applications provides a highly efficient and desirable ammonia still system for the efficient recovery of ammonia from weak ammonia liquors formed during metallurgical coking operations.

Briefly the pre-precipitation and clarification system preferably comprises a pre-precipitation and mixing tank 115 for mixing a suspension of milk of lime, or calcium hydroxide, hereinafter referred to broadly as lime, with weak ammonia liquor, and a settling tank or thickener 117 where residual lime particles and calcium compounds precipitated from the WAL are removed from the mixture of WAL and milk of lime. Clarified weak ammonia liquor is passed from the clarifier or thickener 117 directly to the top of the ammonia still 81, which is comprised of only a single distillation leg. The WAL is mixed with sufficient lime to free all of the fixed ammonia in the WAL. All of the ammonia will be liberated from its compounds by reaction in the mixing tank 115. The soluble compounds together with the ammonia dissolved in the liquor pass into the top of the still through conduit 112. Freed ammonia is then stripped from the liquor by the passage therethrough of the steam and inert stripping gas. Solids, including precipitated compounds formed by reaction of the calcium with soluble ammonia compounds, remain in the thickener-clarifier 117. Such solids, therefore, cannot foul the bubble caps or other gas liquid interchange means in the ammonia still or the heat exchange means in the heat exchanger. The weak ammonia liquor still is as a consequence much more reliable and efficient and may be operated for long periods without shutdown for cleaning. The heat exchanger is not as subject, furthermore, to the formation of scale and other fouling deposits which may directly interfere with heat transfer in an indirect heat exchanger or with effective intercontact of the inert gas and hot still bottoms in a direct heat exchanger. The auxiliary stripping gas is thus more effectively heated and humidified and the efficiency of the auxiliary heating gas in heating and stripping in the still is thus indirectly still further increased, while the average consumption of the primary stripping steam is further decreased over extended periods.

Alternatively, solids including precipitated compounds formed by reaction of the calcium with soluble ammonia compounds, may be removed from the WAL at some other point prior to passage of the still bottoms from the bottom of the still into the heat exchanger. For example, the still bottoms could be passed through an insulated settling tank in which the still bottoms are clarified prior to passage into the heat exchanger where the clarified liquor heats the inert auxiliary stripping gas. Other arrangements for clarifying the deammoniated WAL or still bottoms prior to the time it reaches the heat exchanger can also be used.

The pre-precipitation and clarification system includes, in addition to the mixing tank 115 and the thickener-clarifier 117, various auxiliary apparatus such as rake blades 121 in the thickener, a shaft 123 upon which the rakes are supported, a motor-gear reducer 125 and belt drive 127 to drive the shaft 123, circumferential deflector plate 129 in the top of the thickener forming a feedwell into which the premixed WAL and lime suspension is directed via conduit 131 from the mixing tank 115 and a circumferential weir-channel or launder 133 about the periphery of the thickener-clarifier into which clarified WAL solution overflows from near the surface 134 of the body of liquid in the clarifier and from which the WAL drains via conduit 113 into the top of the single leg stil 81.

A mixing tank 135 in which a milk of lime suspension is prepared or stored is connected with the pre-precipitation tank 115 by conduit 137. The pre-precipitation tank 115 is supplied with WAL via conduit 139 from a sump or collection tank, not shown, associated with the primary cooler, also not shown, of a coking operation. Rotary agitators 140 and 141, in the lime mix tank 135 and the pre-precipitation tank 115 respectively, are driven by motor 143 through drive belts 145 and 147. Sump lines 149 and 151 are directed from the bottoms of the pre-precipitation tank 115 and the thickener-clarifier 117 respectively for the discharge of solids at periodic intervals from the bottoms of these vessels to a sump 153 for later disposal in any convenient manner. It may be desirable to filter the discharge from the sump lines and particularly the underflow from the thickener and combine the filtrate with the overflow from the thickener 117. The additional filtering equipment is, however, not shown. Various valves 155 are provided in the conduits used in the apparatus at appropriate and convenient locations.

The operation of the apparatus shown in FIG. 2 is broadly similar to that shown in FIG. 1. The WAL, which has in this case undergone a preliminary precipitation and clarification in the pre-precipitation tank 115 and thickener-clarifier 117 respectively, is passed into the top of the distillation column 81 via conduit 113 and passes downwardly from tray to tray in countercurrent stripping relationship with hot inert gas, steam and hot vapors derived from the WAL which pass upwardly through the bubble cap arrangement in each tray. The ammonia which has been stripped from the WAL passes through the dephlegmator and out the ammonia discharge conduit 93 to some further treatment such as a cooler and ammonia absorber. The hot still bottoms, or residual liquor, which collects in the bottom of the still passes via conduit 99 into the heat exchanger 95 where it serves to preheat and humidify an inert non-condensable gas such as air, or in some cases natural gas or the like, which enters the heat exchanger 95 through conduit 103 and then passes up in heat exchange relationship countercurrently to the descending residual ammonia liquor. The residual heat of the liquor is to a large degree transferred to the ascending gas by partial evaporation of the liquor and this heat is carried into the mixing chamber 102 with the gas where the hot humid gas is premixed with hot steam from the conduit 111. A small amount of the heat content of the steam serves to heat the gas to a still higher temperature and the mixture of inert, non-condensable gas and steam is then admitted to the still through inlet orifice 102A. The preheating and humidification of the auxiliary stripping gas serves to recover some of the heat which has already been transmitted to the WAL in the distillation column and serves to replace from 10 to 30% of the normal steam requirements of the stripping column, with a consequent saving in energy.

Figure 3:
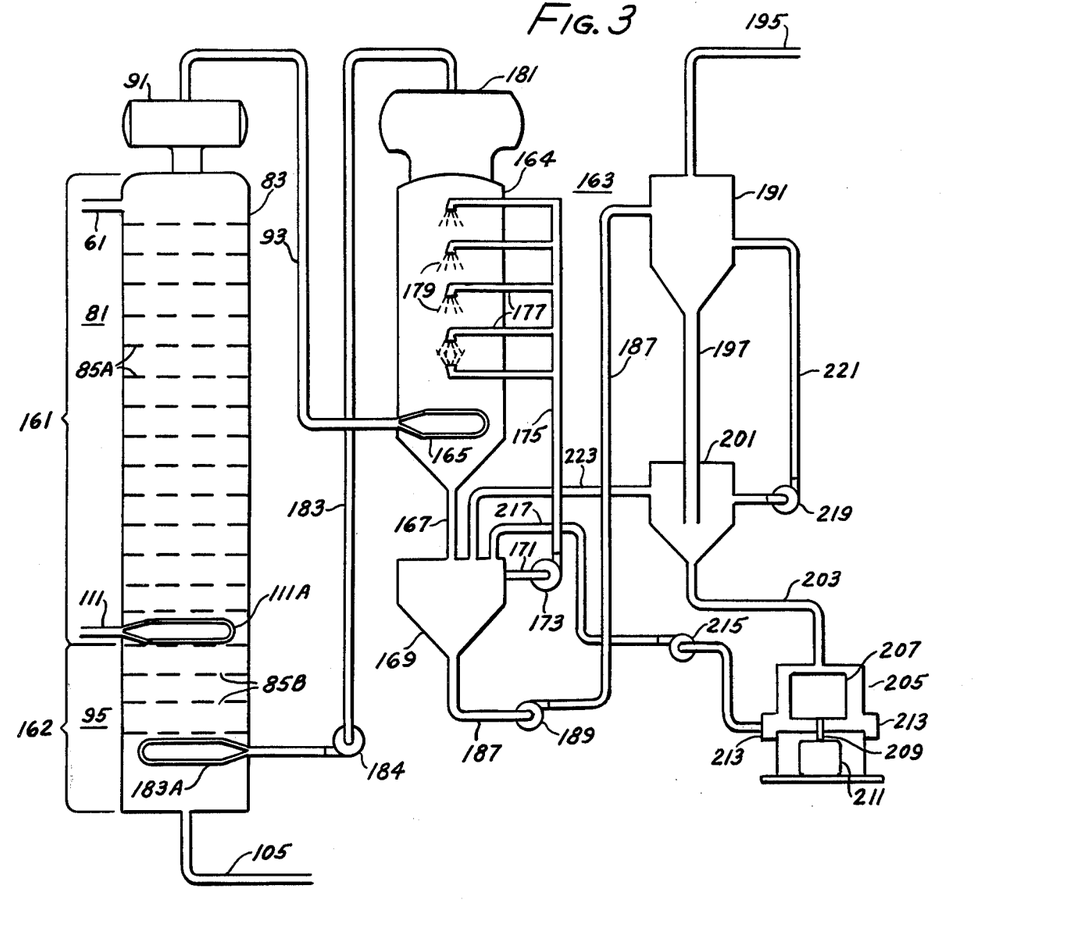
FIG. 3 is a schematic cross-sectional representation of an alternative embodiment of apparatus for practicing the invention.

In FIG. 3 there is shown a further embodiment of the invention which is especially designed for use with an inert gas such as argon or nitrogen, which is too expensive to be allowed to escape with the ammonia laden gas which leaves the distillation column through the ammonia discharge conduit. In this case a recovery arrangement must be provided to collect and recycle the inert gas to the heat exchanger for reuse in the distillation column. In FIG. 3 the same basic single leg ammonia distillation column and heat exchanger combination shown in FIG. 2 is shown and the same designating numerals are in general used to refer to these elements. Since a single leg ammonia still is used, it is necessary for the pre-precipitation arrangement of FIG. 2 to be used. Thus it will be understood that the WAL received in the ammonia still of FIG. 3 will be derived from a pre-precipitation treatment, and preferably also a clarification treatment, in apparatus similar to the apparatus shown in FIG. 2, though such accompanying apparatus is not specifically shown. If the additional pre-precipitation step is not used then the distillation portions of the still would be similar to a more conventional still such as shown in FIG. 1. Reference may be had to FIG. 2 and the accompanying description for an explanation of the still shown in FIG. 3.

The only difference between the single leg weak ammonia liquor still in FIG. 2 and the still in FIG. 3 is the construction of the heat exchanger 95 and the trays in the still. In FIG. 3 the individual trays in the still are sieve type trays, which in the drawing are shown as dual flow type trays in which the liquor and the steam and stripping gas pass countercurrently through the same orifice. It will be understood that a sieve tray arrangement including the customary weirs and downcomers can also be used. It will be preferable to use a sieve tray arrangement where the conventional still arrangement is sued or where only the pre-precipitation treatment shown in FIG. 2 is used. However, it may be desirable to use a bubble cap arrangement where the clarifying arrangement shown in FIG. 2 is also used, since in this arrangement no sedimentation fouling of the still will occur and the bubble cap arrangement is inherently a more efficient gas/liquid contact arrangement.

The other difference between the still and heat exchanger shown in FIGS. 2 and 3 is a difference in arrangement rather than operation, or details of operation. While in FIG. 2, and also FIG. 1, the heat exchanger is illustrated as separate from the still, in FIG. 3 the heat exchanger is shown as being merely a lower extension of the still itself. The still portion zone of the column is indicated by brackets as a portion zone 161 and the heat exchanger portion is indicated by brackets as a portion 162. The same designation numerals are used as in FIG. 2 for the still and the heat exchanger. Weak ammonia liquor continues from the dual flow sieve trays 85A above the area into which stripping steam is admitted from conduit 111 via a distributor ring 111A down past additional dual flow sieve trays 85B having a somewhat smaller orifice area than the higher trays in the stripping portion 161 of the still. Alternatively the same orifice area can be used in all of the trays. An inert auxiliary stripping gas passes from a conduit 183 via distributor ring 183A into the bottom of the heat exchanger section 162 of the still 81. The residual still bottoms collect in and pass from the bottom of the heat exchanger via conduit 105 as in FIG. 2 to storage or some further treatment, not shown. Since the trays themselves serve as gas distributors the use of the distributor rings 111A and 183A is optional.

As in FIG. 2 the inert non-condensable auxiliary stripping gas passes countercurrently to the still bottoms, or residual weak ammonia liquor, in the heat exchanger section or zone of the still. The gas is consequently heated and humidifed and the still bottoms are cooled. The auxiliary stripping gas then enters the stripping portion or zone of the still where it is further heated by the steam from the distributor ring 111A and then serves in conjunction with the primary stripping gas, i.e. in the case illustrated, steam, to strip the ammonia from the weak ammonia liquor. The use of the auxiliary stripping gas renders the distillation system regenerative, because heat is recovered and used to increase the heat content of the system without a concurrent increase in total heat input.

After the ammonia laden gas leaves the still via discharge conduit 93 it passes through a gas separation apparatus where the inert gas is separated from the ammonia, and preferably water and other vapors derived from the stripping of the WAL. The inert gas is then returned via a recycle line to the bottom of the heat exchanger for reheating and reuse as an auxiliary stripping gas. The separation apparatus may comprise several types of apparatus such as, for example, a so-called ammonia saturator or alternatively a spray absorber arrangement such as shown in FIG. 3.

The auxiliary gas, which originally entered the still 81 from heat exchanger 95, ultimately passes from the still via dephlegmator 91 and ammonia vapor conduit 93 to an absorption apparatus 163 in which ammonia and excess water vapor may be removed from the inert auxiliary stripping gas. The absorption apparatus is comprised of an absorption spray tower 164 into the lower portion of which the ammonia vapor and accompanying auxiliary gas is conducted via conduit 93 and distributor ring 165. Below the absorption tower and connected thereto by a conduit 167 is a circulation tank 169 from which a dilute sulfuric acid solution containing about 6% sulfuric acid is continuously circulated via conduit 171, pump 173, conduit 175 and a series of spray lines or headers 177 connected to spray heads or nozzles 179 which spray the sulfuric acid solution into the ammonia vapor and inert gas passing up through the absorption tower. The ammonia vapor in the gas dissolves into the dilute sulfuric acid spray droplets and the ammonia reacts with the sulfuric acid forming ammonium sulfate $(NH_4)_2SO_4$. The remaining vapors and inert gas pass from the top of the absorption tower 163 via mist eliminator 181 into inert gas recycle conduit 183 and returns via pump 184 to the heat exchanger 95 where the inert gas is heated by countercurrent contact with the hot still bottoms for reuse as an auxiliary stripping gas in the still 81.

The dilute sulfuric acid solution together with ammonium sulfate collects in the bottom of the absorption tower 164 and then passes via conduit 167 into the circulation tank 169. Part of the solution is recirculated immediately via conduit 171, pump 173, conduit 175 and headers 177 to the spray heads 179 in the absorber, while another portion is drawn from the bottom of the circulation tank and passed via conduit 187 and pump 189 to a vacuum vaporizer vessel 191 supplied with a vacuum line 195 and settling throat 197. Water vapor is extracted from the solution by the reduced pressure and the resulting concentration of the solution plus cooling of the solution by evaporation causes a significant amount of ammonium sulfate to crystallize from the solution. The remaining solution plus entrained ammonium sulfate crystals are then passed by gravity through the settling throat 197 into a separation tank 201. The underflow from settling tank 201, comprising largely a thin slurry of ammonium sulfate crystals in the sulfuric acid-ammonium sulfate liquor, is passed through conduit 203 to a filter 205, which, as shown diagrammatically, may be a centrifugal filter having a central basket 207 rotatable on a shaft 209 by a motor 211. Ammonium sulfate crystals are removed from the filter periodically while the filtrate is pumped from filtrate trough 213 back to the circulation tank 169 by pump 215 via conduit 217. Sulfuric-sulfate solution is also recirculated between the separation tank 201 and the vaporizer vessel 191 via pump 219 and conduit 221. Additional solution is overflowed from the upper portion of the separation tank 201 through conduit 223 to the circulation tank 169.

It will be seen that by the use of the arrangement shown in FIG. 3 an inert gas may be used and then recovered for reuse. This recovery allows the use of argon, nitrogen or other gases which are too expensive to justify single pass operation.

While the arrangement shown in FIG. 3 is very satisfactory for the treatment of inert gases which are too expensive to be discarded, it will be understood that other arrangements of apparatus could also be used. For example, a more conventional ammonia saturator could be used in which ammonia is dissolved into a sulfuric acid solution until a supersaturated solution is formed from which ammonium sulfate spontaneously precipitates without further treatment. With respect to other less expensive inert, non-condensable gases, other less sophisticated arrangements may be satisfactory. Air can conveniently be used as an auxiliary stripping gas if it is not desired to recover the ammonia values. In this event the ammonia vapor mixed with air can be sent directly to a combustion chamber and oxidized.

It is also possible to use natural gas as an auxiliary stripping gas for ammonia vapor derived from a coal coking operation if a source of natural gas is available. The natural gas should be free of $CO_2$, because of the danger of formation of calcium carbonate in the still when the gas contacts the limed WAL. However, if the natural gas is $CO_2$ free, the auxiliary stripping gas and ammonia vapor can then be passed directly into the coke oven gas stream prior to the passage of the coke gas through the usual ammonia saturator or absorber. An arrangement such as this decreases the number of treatment steps which would otherwise be necessary. The natural gas in this case also adds desirable fuel values to the coke gas, though only to a small degree, because the ammonia vapor from the still constitutes only a small fraction of the total gas volume in the coke gas.

Coke gas itself can also conveniently be used as an effectively inert non-condensable auxiliary stripping gas. However, coke oven gas contains significant amounts of carbon dioxide which must be removed from the coke gas which is to be used as an auxiliary stripping gas prior to its passage into the stripping column. Carbon dioxide can be readily removed by passing the gas initially through a caustic solution in a spray tower or packed column or the like, but because of the cost of caustic such an initial pretreatment may not always be the most satisfactory procedure. However, once the carbon dioxide is removed from the coke gas it can very conveniently be used as an auxiliary stripping gas and can then be very readily passed together with the ammonia vapors derived from the still into the main coke oven gas stream for treatment in the main ammonia saturators or absorption apparatus. An arrangement such as this is shown schematically in FIG. 4.

Figure 4:
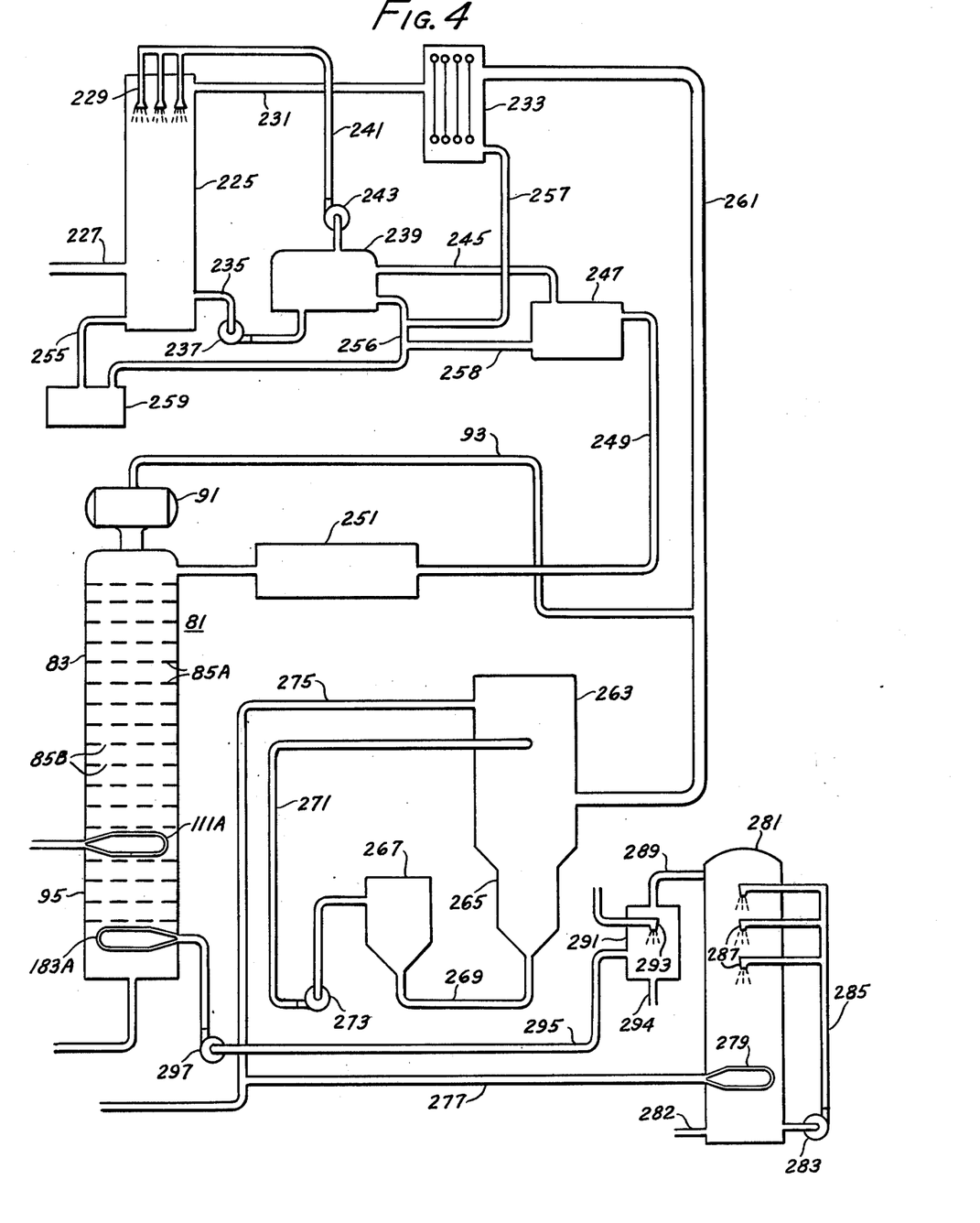
FIG. 4 is a schematic cross-section of a still further alternative for practicing the invention.

In FIG. 4 there is shown an ammonia still and heat exchanger identical to the still and heat exchanger shown in FIG. 3. The same identifying numerals are used to identify the various parts of this apparatus as are used in FIG. 3. It will be understood that since this still 81 is a single leg still, furthermore, that the pre-precipitation arrangement shown in FIG. 2 will also be used if the still uses lime, i.e. quicklime, or calcium hydroxide, to release the fixed ammonia from the liquor and it will additionally be very desirable for the clarification arrangement shown in FIG. 2 to be used also. Alternatively the still can also be of a conventional type such as is shown in FIG. 1.

The coke oven gas from which the ammonia liquor is obtained enters a conventional primary cooler 225 from coke gas conduit 227. The gas is cooled with an aqueous solution from spray heads 229 and then passes via gas conduit 231 to a tar precipitator 233 where a series of electrostatic precipitator plates serve to remove entrained tar from the gas. The aqueous solution from the spray heads 229 meanwhile descends through the primary cooler 225 and collects in the bottom of the cooler vessel. As the cooling solution contacts the coke gas it condenses excess moisture and absorbs ammonia and other compounds and becomes weak ammonia liquor. The liquor is pumped from the bottom of the primary cooler via conduit 235 and pump 237 to an ammonia liquor cooler 239 from which some of the liquor is recirculated via conduit 241 and pump 243 to the spray heads 229. A portion of the weak ammonia liquor is passed via conduit 245 to weak ammonia settling tank 247 which serves both as a storage tank and a settling tank to remove additional tar and precipitates from the weak ammonia liquor prior to passage to the weak ammonia liquor still 81 via conduit 249. The weak ammonia liquor will preferably pass via the conduit 249 first to a pre-precipitation and clarification treatment similar to that shown in FIG. 2 which for simplicity is represented in FIG. 4 by a block 251 in line 249 prior to passage of the WAL into the still 81. As noted above, however, if the still was a conventional still the preferred pre-precipitation and clarification steps represented by block 251, and shown in more detail in FIG. 2, might not be used. Tar, which settles from the weak ammonia liquor in the bottom of the primary cooler 225, the ammonia liquor cooler 239, the tar precipitator 233 and the weak ammonia settling tank 247, may be passed via conduits 255, 256, 257 and 258 respectively to a tar collecting tank 259.

The coke oven gas passes from the tar precipitator 233 via coke gas conduit 261 to an ammonia saturator conventionally composed of an absorber section 263, a downcomer section 265 and a crystallizer 267 together with a connecting conduit 269 and a solution recirculation conduit and pump 271 and 273.

The coke oven gas with its ammonia content decreased to a very low level then passes from the ammonia absorber or saturator to some further treatment, usually a final cooler, not shown, via coke gas conduit 275. A take off conduit 277 from coke gas conduit 275 removes a small amount of the total ammonia free coke gas and conveys it into a distributer ring 279 in the bottom of a carbon dioxide absorption tower 281. Potassium hydroxide, sodium hydroxide, or any other carbon dioxide absorbent solution is continuously pumped from the bottom of the absorption tower 281 via pump 283 and conduit 285 to spray heads 287 in the top of the absorption tower 281. A portion of the absorbent solution is continuously bled from the bottom of tower 281 through conduit 282 to further treatment. As the absorbent solution is sprayed down past the ascending coke gas it absorbs the carbon dioxide content of the gas. The $CO_2$ free gas passes from the top of the tower 281 via conduit 289 to a wash tower 291 where the gas is washed if necessary with water from spray head 293 to remove entrained carbon dioxide absorbent solution, and then passed via conduit 295 via pump 297 to auxiliary gas distributor ring 183A in the heat exchanger 95, while the used wash water passes from conduit 294 to waste or further treatment. The operation of the still 81 is then the same as described for FIGS. 2 or 3. The stripped ammonia vapor ultimately passes from the top of the still via dephlegmator 91 and ammonia vapor conduit 93 and is passed directly into the coke oven gas conduit 261 prior to the time the coke oven gas enters the ammonia saturator 263. The ammonia from the ammonia vapor is thus combined with the coke gas prior to the removal of ammonia from the gas by the usual ammonia saturator or absorber, thus not only recovering the ammonia as ammonium sulfate but also saving in operating equipment and operation.

Figure 5:
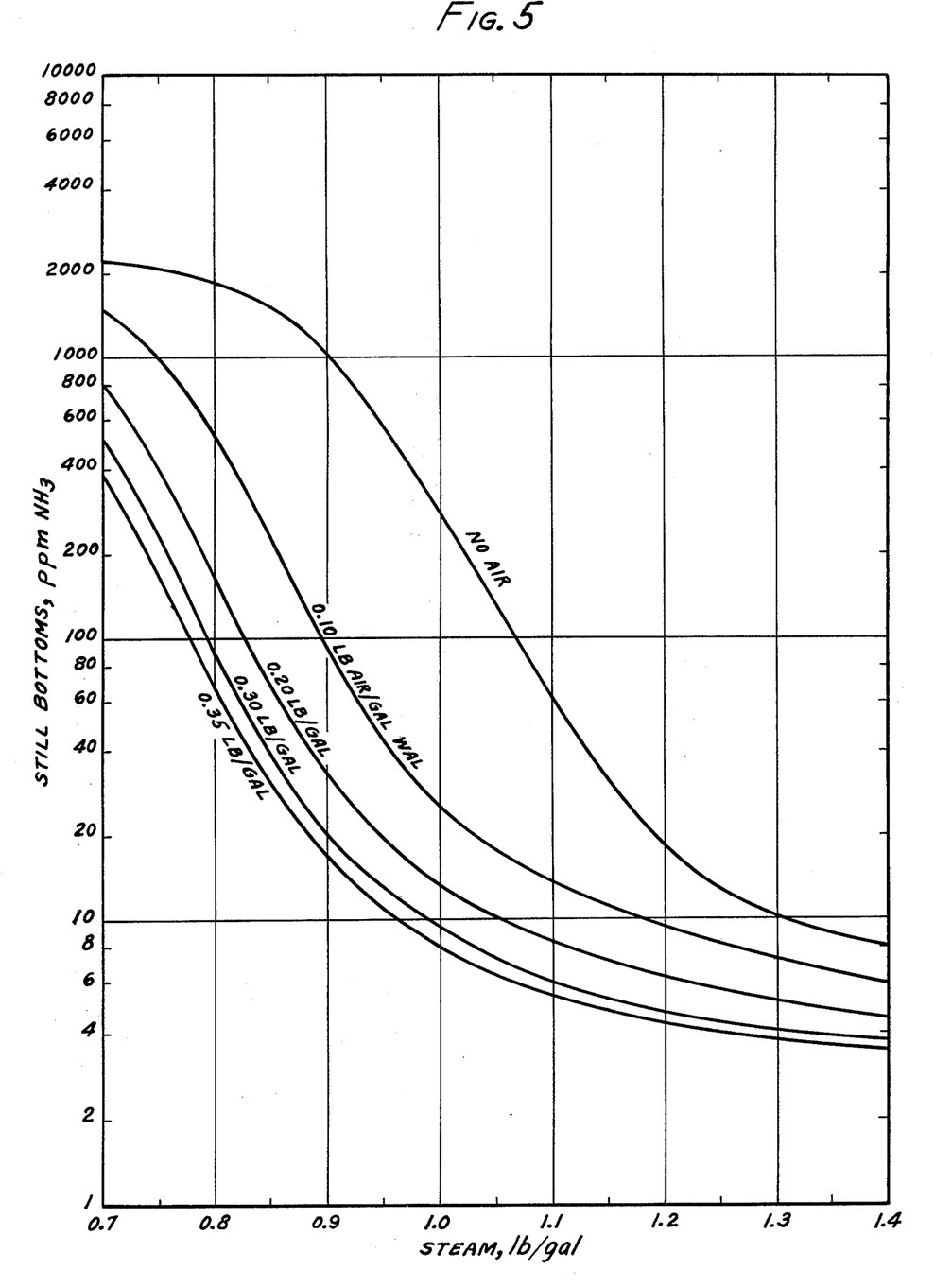
FIG. 5 is a graphical comparison of the amount of steam necessary to remove ammonia from weak ammonia liquor to a certain residual concentration using several different hot gas flows.

FIG. 5 is a graph illustrating the results of tests made with a pilot ammonia still in accordance with the invention. Various combinations of steam and air, heated in a direct contact heat exchanger, were used to strip the volatile components from weak ammonia liquor generated in a metallurgical coke plant. A set of five curves are plotted against parts per million of residual ammonia remaining in the still bottoms on the ordinate and pounds of steam used per gallon of WAL treated on the abscissa. The parts per million of ammonia is plotted logarithmically. The curve to the right defines the amount of steam with no air while the next four curves progressing to the left define the amount of steam required when using 0.10 pounds, 0.20 pounds, 0.30 and 0.35 pounds respectively of heated and humidified air per gallon of WAL treated. A temperature of between 166° F. and 211° F. (74 and 99° C.) was maintained during these tests in the gases leaving the ammonia still while the temperature of steam entering the still was 325° F. (160° C.) and the temperature of the heated and humidified air passing from the heat exchanger into the bottom of the still was 190 to 212° F. (90 to 100° C.) depending upon the gas flow used. As is shown by the set of curves in FIG. 5, the use of 0.1 lb of heated and humidified air per gallon of weak ammonia liquor reduces the amount of steam necessary to reduce the ammonia in the liquor to 50 parts per million from about 1.12 lbs of steam per gallon to about 0.94 lbs of steam per gallon, or a steam savings of 0.18 lbs of steam per gallon of weak ammonia liquor. Similarly, by adding 0.20 lbs of heated and humidified air per gallon of liquor, the steam demand is reduced to about 0.87 lbs per gallon resulting for a savings of about 0.25 lbs of steam per gallon of liquor treated.

The data shown in FIG. 5 also indicates that there is a limit to the amount of steam which can be replaced by heated and humidified air, since the spacing of the curves decreases to the left of the graph. The addition of 0.30 lbs of heated and humidified air per gallon of weak liquor saves only about 0.29 lbs of steam, i.e. 0.04 lbs additional steam over that saved by using 0.20 lbs of heated and humidifed air, and the use of 0.35 lbs of heated and humidified air per gallon of weak liquor saves only about 0.01 additional lbs of steam. Nevertheless, these data show that the process of the invention operates to save a significant percentage of the energy necessary to remove ammonia from weak ammonia liquor in the conventional process.

Within the scope of our invention, we envision several alternative embodiments of the apparatus. For example, the heat exchange apparatus used may be either the indirect type or the direct contact type. It is preferred, however, to use a direct contact type heat exchanger because in such apparatus the gas is not only heated, but also is saturated with moisture from the ammonia still effluent during the heat exchange period, thereby saving that portion of steam that would otherwise be required for such saturation.

Also while all of the hot effluent liquor from the bottom of the still is shown in the various FIGURES as passing through the heat exchange means, as is most preferable since the maximum heat is usually desired to be imparted to the gas, it is possible that in some circumstances it may be desired to direct only a portion of the hot bottom effluent liquors from the still to the heat exchange means.

Finally, we contemplate the use of any one of several different gases in the heat exchanger, the choice of which will depend partly on the end use to which the ammonia is to be put. The basic requirements for such a gas are, however, that it be both non-condensable and chemically inert to limed weak ammonia liquor. Inert gases suitable for use are air, nitrogen or any of the noble gases such as helium, argon, etc. Each of these inert gases may be heated and humidified by heat exchange with devolatilized liquid effluent from a stripping operation and then combined with a primary stripping and heating gas, which primary gas will usually be steam, but could also be some other heated gas, to form a multicomponent gaseous stripping medium. The multicomponent stripping medium may then be passed into any suitable containment means such as, for example, the usual still type apparatus where the stripping medium serves to effect the desired stripping of volatilizable materials from liquid containing such materials.

The choice of gas will be a function both of cost and of suitability for the end use to which the ammonia is to be put. If, for example, ammonia is merely to be destroyed after it is removed from the weak ammonia liquor, air would be an ideal auxiliary stripping gas since it would be inexpensive and would supply the oxygen necessary to support combustion of the ammonia.

If, on the other hand, it is desired to manufacture ammonium sulfate by the use of a sulfuric acid scrubber, an inert gas such as nitrogen or argon may be preferred. Due to the cost of such gases, however, their use is predicated on the use of a recycle arrangement such as shown in FIG. 3 whereby these gases can be separated from the ammonia and other gases and recycled to the heat exchanger.

It will also be understood that while the invention has been illustrated in use with an ammonia stripping operation and apparatus suitable for such an operation has been broadly illustrated, alternative apparatus may be used, and that it is contemplated that the invention will also be useful broadly for other stripping operations where a hot stripping gas is used to strip volatile elements from a liquid. Thus any apparatus or means which will accomplish the preheating of an effectively inert auxiliary gas and pass it along with a primary hot stripping gas into an apparatus or means in which stripping of vaporizable components of the liquid can be conducted will be sufficient to practice the invention.

We claim:

1. A regenerative method of removing volatile components from a liquid comprising:
  (a) passing a hot primary stripping gas through the liquid from which volatiles are to be stripped in a stripping zone together with an inert, noncondensible, hot auxiliary stripping gas which has been preheated by gas-liquid heat exchange in a heat recovery zone with a portion of the liquid already exposed to said primary and auxiliary stripping gases in said stripping zone, to heat the liquid in the stripping zone and expel volatiles therfrom,
  (b) withdrawing the heated liquid from the stripping zone after volatiles have been stripped therefrom and passing at least a portion of the heated stripped liquid to the heat recovery zone,
  (c) passing the heated liquid downwardly through said heat recovery zone countercurrently with and in direct contact with said auxiliary stripping gas passing upwardly through the heat recovery zone to recover heat from the heated stripped liquid by increasing the temperature of and humidifying the auxiliary stripping gas and cooling and evaporating a portion of the stripped liquid,
  (d) removing the residual cooled stripped liquid from the lower portion of the heat recovery zone, and
  (e) passing the heated and humidified auxiliary stripping gas from the upper portion of the heat recovery zone, together with the heat recovered from the cooled liquid by heating and humidifying said auxiliary gas, to the stripping zone together with the primary stripping gas to strip the liquid whereby a saving in heat values required from the primary stripping gas is effected.

2. A regenerative method of removing volatilizable components from a liquid according to claim 1 wherein the inert auxiliary stripping gas is separated from the volatilizable components and recycled back to be reheated by heat exchange with the liquid already exposed to the primary and auxiliary stripping gases and is then repassed through the liquid.

3. A method of stripping volatilizable components from a liquid comprising:
  (a) passing a multicomponent gaseous stripping medium comprised of a hot primary stripping gas and a hot inert noncondensible auxiliary stripping gas through the liquid in a stripping zone to heat the liquid and expel volatiles from the liquid, (b) removing the volatiles expelled from the liquid from the vicinity of the liquid, (c) removing residual heated liquid from which volatiles have been expelled from the stripping zone, and (d) preheating inert noncondensible gas by regenerative heat exchange with said residual liquid in a heat recovery zone to recover heat from the residual liquid by increasing the temperature of and humidifying the gas through direct contact with the hot liquid while cooling the liquid to a lower temperature to form a preheated inert auxiliary stripping gas, (e) removing the cooled residual liquid from the heat recovery zone, and (f) directing said preheated and humidified auxiliary gas into contact in said stripping zone with liquid from which volatiles have not been completely expelled as a portion of the multicomponent gaseous stripping medium.

4. A method of steam volatilization of volatilizable components from a liquid comprising:

(a) passing steam into said liquid in a stripping zone to heat said liquid and induce evolution of volatilizable components as a vaporous effluent, (b) passing at least a portion of the remaining heated liquid effluent in countercurrent direct heat exchange relationship within a heat recovery zone with a noncondensible gas which is substantially inert to said liquid and said volatilizable components to preheat and humidify said gas and thereby recover heat from said liquid by cooling and evaporating the effluent liquid to a lower temperature, (c) passing the preheated and humidified gas into said liquid in the stripping zone during volatilization of volatilizable components to aid in heating said liquid and volatilizing said volatilizable components from said liquid and to increase the heat content of the stripping zone without concurrent increase in total heat input to the system by the steam, and (d) passing the cooled liquid effluent and vaporous effluent from the system.

5. A method of expelling ammonia from weak ammonia comprising:

(a) contacting the weak ammonia in a stripping zone with a multicomponent gaseous stripping medium comprised of a hot primary stripping gas and a hot substantially inert auxiliary stripping gas, (b) removing ammonia expelled from the liquor from the vicinity of the liquor, (c) removing residual heated liquor from which ammonia has been expelled from the stripping zone and passing it in direct regenerative heat exchange relationship in a heat recovery zone with inert noncondensible gas to preheat and humidify the gas and thereby recover heat from the residual liquor as a whole by cooling the residual liquor to a lower temperature and form a preheated and humidified inert noncondensible auxiliary stripping gas, (d) passing the cooled residual liquor from the heat recovery zone, and (e) passing the preheated and humidified auxiliary stripping gas into contact with said weak ammonia liquor in said stripping zone to heat the liquor and expel ammonia therefrom.

6. A method in accordance with claim 5 in which the inert auxiliary stripping gas is separated from the expelled ammonia and recycled back to be reheated by heat exchange with the residual liquor prior to reuse.

7. A method in accordance with claim 5 in which the substantially inert auxiliary stripping gas contains carbon dioxide and is initially passed through an absorption medium to remove the carbon dixoide prior to contacting the weak ammonia liquor.

8. A method in accordance with claim 5 in which the residual heated liquor from which ammonia has been expelled is clarified prior to passing it in heat exchange relationship with the inert non-condensable gas.

9. A method in accordance with claim 8 in which the residual heated liquor is clarified prior to its contact in the form of weak ammonia liquor with the multicomponent gaseous stripping medium.

10. A regenerative method of removing volatile components from a liquid comprising:

(a) preheating and humidifying an auxiliary stripping gas in a heat recovery zone by placing said gas in direct countercurrent gas-liquid heat exchange relationship with heated liquid from which volatile components have been removed, heating being recovered in said heat exchange zone by heating and humidifying said auxiliary stripping gas while cooling said liquid to a lower temperature as it passes through said heat recovery zone, (b) passing said cooled liquid from the heat recovery zone, and (c) passing said preheated and humidified auxiliary stripping gas together with a hot primary stripping gas through liquid in said stripping zone to expel volatiles and heat the liquid which is subsequently placed in heat exchange relationship with the auxiliary stripping gas.

11. A method of stripping volatilizable components from a liquid comprising:

(a) preheating and humidifying an inert gas in a heat recovery zone by direct contact with heated liquid from which volatilizable components have been removed to recover heat from the heated liquid by heating and humidifying the inert gas while cooling the liquid to a lower temperature to form a preheated and humidified hot inert auxiliary stripping gas and a relatively cooled liquid which is removed from the heat recovery zone, (b) directing said preheated and humidified auxiliary stripping gas from the heat recovery zone and passing it together with a hot primary stripping gas comprised of steam through feed liquid in a stripping zone to heat the liquid and expel volatilizable components therefrom prior to passing the heated liquid in a heat exchange relationship in the heat recovery zone with the inert gas to preheat and humidify the inert gas and cool the liquid.

* * * * *

UNITED STATES PATENT AND TRADEMARK OFFICE
CERTIFICATE OF CORRECTION

PATENT NO. : 4,140,586

DATED : February 20, 1979

INVENTOR(S) : Daniel Kwasnoski and C.J.Sterner

It is certified that error appears in the above-identified patent and that said Letters Patent are hereby corrected as shown below:

Col. 8, line 42, "112" should read --113--.

Col. 9, line 22, "stil" should read --still--.

Col. 10, line 48, "sued" should read --used--.

Col. 18, claim 10, subparagraph (a) line 30, "heating" should read --heat.

Signed and Sealed this

Nineteenth Day of June 1979

[SEAL]

Attest:

RUTH C. MASON
Attesting Officer

DONALD W. BANNER
Commissioner of Patents and Trademarks